United States Patent [19]

Völkner

[11] Patent Number: 5,080,797

[45] Date of Patent: Jan. 14, 1992

[54] METHOD OF DISPOSING OF FECAL MATTER FROM TOILET SYSTEMS IN FAST MOVING VEHICLES

[75] Inventor: Wolfgang Völkner, Worme, Fed. Rep. of Germany

[73] Assignee: Telefunken Systemtechnik GmbH, Ulm, Fed. Rep. of Germany

[21] Appl. No.: 603,566

[22] Filed: Oct. 26, 1990

[30] Foreign Application Priority Data

Oct. 26, 1989 [DE] Fed. Rep. of Germany ....... 3935675
Mar. 31, 1990 [DE] Fed. Rep. of Germany ....... 4010492
May 21, 1990 [DE] Fed. Rep. of Germany ....... 4016269

[51] Int. Cl.⁵ .............................................. B01D 61/00
[52] U.S. Cl. ................................... 210/652; 210/768; 210/770; 210/123; 210/181; 4/317; 4/318; 4/320
[58] Field of Search ............... 210/652, 651, 770, 167, 210/181, 768, 769; 100/145; 4/317, 318, DIG. 9, 209, 484, 320

[56] References Cited

U.S. PATENT DOCUMENTS

| | | | |
|---|---|---|---|
| 1,096,854 | 5/1914 | Morley | 4/DIG. 9 |
| 3,733,617 | 5/1973 | Bennett | 4/318 |
| 3,922,730 | 11/1975 | Kemper | 4/317 |

OTHER PUBLICATIONS

Hammer, Mark J. *Water and Wastewater Technology* (ED.), p. 297.
*How Things Work, The Universal Encyclopedia of Machines*, vol. I, p. 15, 1972.
The Encyclopedia *Der Grosse Brockhaus*, 1957, pp. 681–682.

Primary Examiner—Frank Spear
Assistant Examiner—Ana M. Fortuna
Attorney, Agent, or Firm—Spencer & Frank

[57] ABSTRACT

A method and apparatus for disposing of fecal matter from a toilet system in a fast moving vehicle during travel of the vehicle. The liquid components of the fecal matter are dehydrated to recover water. The water is disposed of by either discharging the water to the environment of the vehicle or by re-using the water in systems of the vehicle. The remainder of the fecal matter is introduced into a collection vessel of in the vehicle.

18 Claims, 5 Drawing Sheets

METHOD OF DISPOSING OF FECAL MATTER FROM TOILET SYSTEMS IN FAST MOVING VEHICLES CROSS-REFERENCE TO RELATED APPLICATIONS

The present application claims the priority of application Ser. No. P 39 35 675.2, filed Oct. 26th, 1989, application Ser. No. P 40 10 492.3, filed Mar. 31st, 1990, and application Ser. No. P 40 16 269.9, filed May 21st, 1990, all in the Federal Republic of Germany, the subject matter of which are incorporated herein by reference.

BACKGROUND OF THE INVENTION

The present invention relates to a method of disposing of fecal matter from a toilet system in a fast moving vehicle and apparatus for implementing the method.

In fast moving vehicles, particularly in aircraft, toilet systems are employed which are equipped with centralized or decentralized collection tanks for fecal matter. The drawback is that the weight of the fecal matter must be carried along during the entire travel of the vehicles.

SUMMARY OF THE INVENTION

It is therefore an object of the present invention to reduce the transported weight of fecal matter in fast moving vehicles, particularly in aircraft.

The above and other objects are accomplished according to the invention by the provision of a method of disposing of fecal matter from a toilet system in a fast moving vehicle during travel of the vehicle, including: dehydrating liquid components of the fecal matter to recover water; disposing of the water by way of discharging the water to the environment of the vehicle or by re-using the water in a system of the vehicle; and introducing the remainder of the fecal matter into a collection vessel in the vehicle.

According to another aspect of the invention there is provided an apparatus for disposing of fecal matter from a toilet system in a fast moving vehicle during travel of the vehicle, including: fecal matter tank means for receiving fecal matter from a toilet system and having an outlet; a pipeline having one end connected to the outlet of the fecal matter tank means and including a controllable valve for opening and closing the pipeline; dehydration tank means having an inlet connected to another end of the pipeline for receiving liquid components of the fecal matter when the valve is open, the dehydration tank means further including heating means for heating the liquid components of the fecal matter, a discharge conduit for removing water evaporated from the liquid components of the fecal matter, and a worm press for compacting and removing the remainder of the fecal matter.

According to yet another aspect of the invention there is provided an apparatus for disposing of fecal matter from a toilet system in a fast moving vehicle during travel of the vehicle, including: fecal matter tank means for receiving fecal matter from a toilet system in the vehicle and having an outlet; a first pipeline having one end connected to the outlet of the fecal matter tank means; dehydration tank means including an inlet connected to another end of the first pipeline for receiving liquid components of the fecal matter from the fecal matter tank means; dehydration means disposed in the dehydration tank means for removing water from the liquid components of the fecal matter; and a return pipeline, including a feed pump, connecting the dehydration tank means to the fecal matter tank means for moving fecal matter remaining in the dehydration tank means into the fecal matter tank means.

The advantage of the present invention is an increase in economy during vehicle operation by the saving of weight. It is here assumed that the weight of the apparatus employed for implementing the method is either compensated by the reduction of the number or size of fecal matter tanks and furthermore, by a reduction of changing volume of flushing water tanks. The advantage is also that it is possible to remove the dehydrated fecal matter without chemical additives.

According to the present invention, the liquid components of fecal matter can be separated by application of a sublimation process, by mechanical processes such as, for example, pressing them out in a worm press, by centrifuging, by evaporation, by filtering, by an adhesion process and/or by an inverted osmotic separation process. Further features of the invention include compacting the residual fecal matter, employing the recovered water as toilet flushing water and conducting the condensation heat required to recover the water to newly supplied fecal matter.

Another feature of the invention is directed toward additionally dehydrating the liquid components of garbage, discharging the resulting water to the environment of the vehicle or re-using it in a system of the vehicle, and introducing the remaining garbage into a collection vessel.

BRIEF DESCRIPTION OF THE INVENTION

Figure 4:
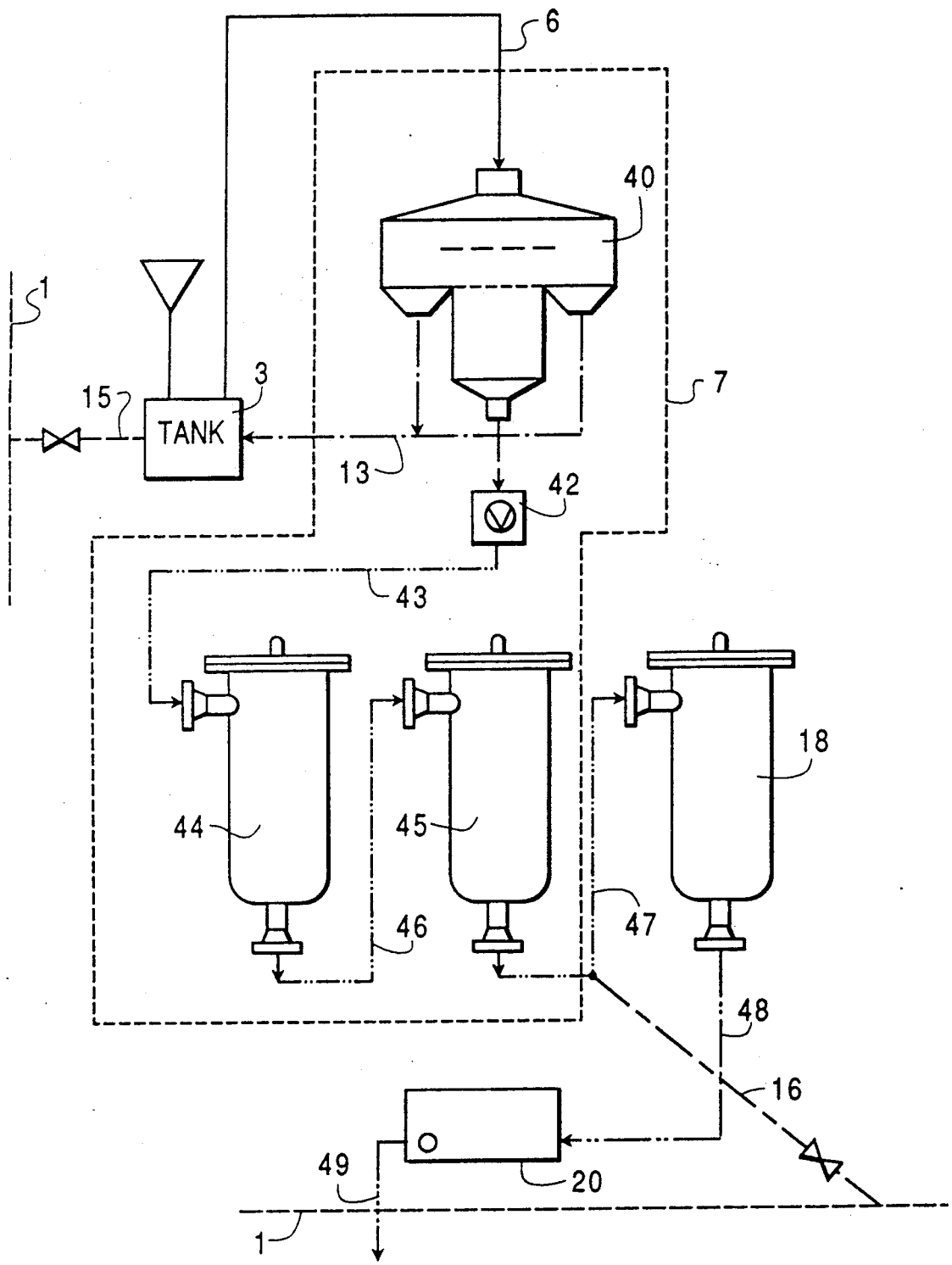

FIG. 4 in a schematic which shows filtering components.

Figure 5:
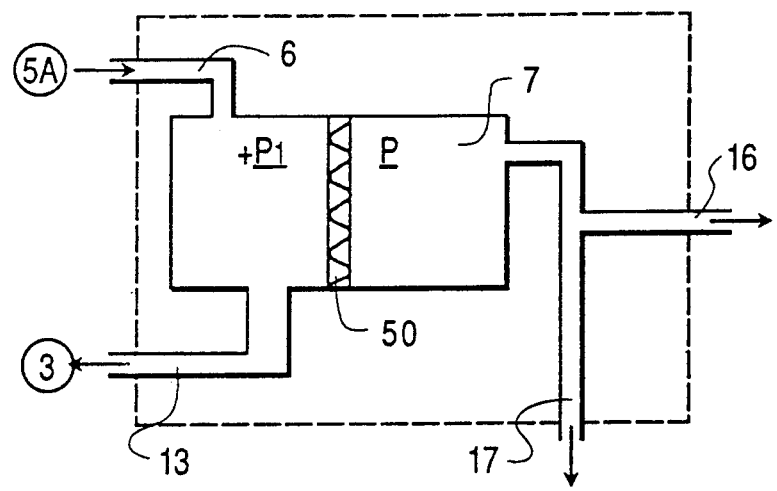

FIG. 5 is a schematic which shows a dehydration tank, where an inverted osmotic principle is employed.

Figure 6:
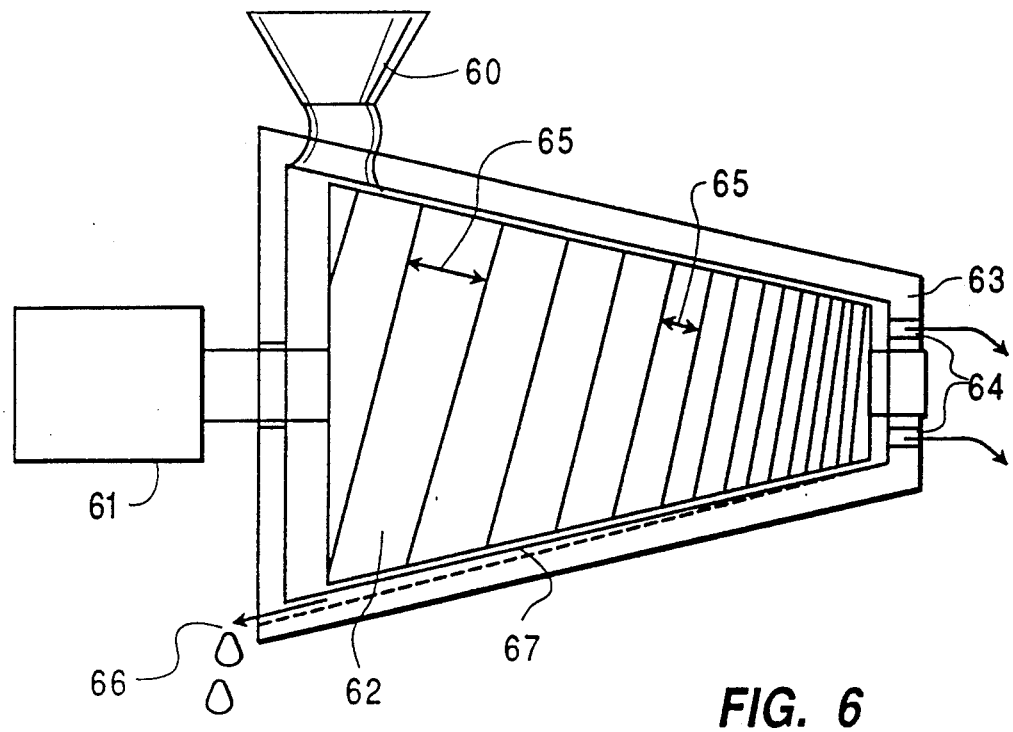

FIG. 6 is a schematic of a type of a worm press that may be used for implementing another embodiment of the invention.

DETAILED DESCRIPTION OF THE PREFERRED EMBODIMENT

Figure 1:
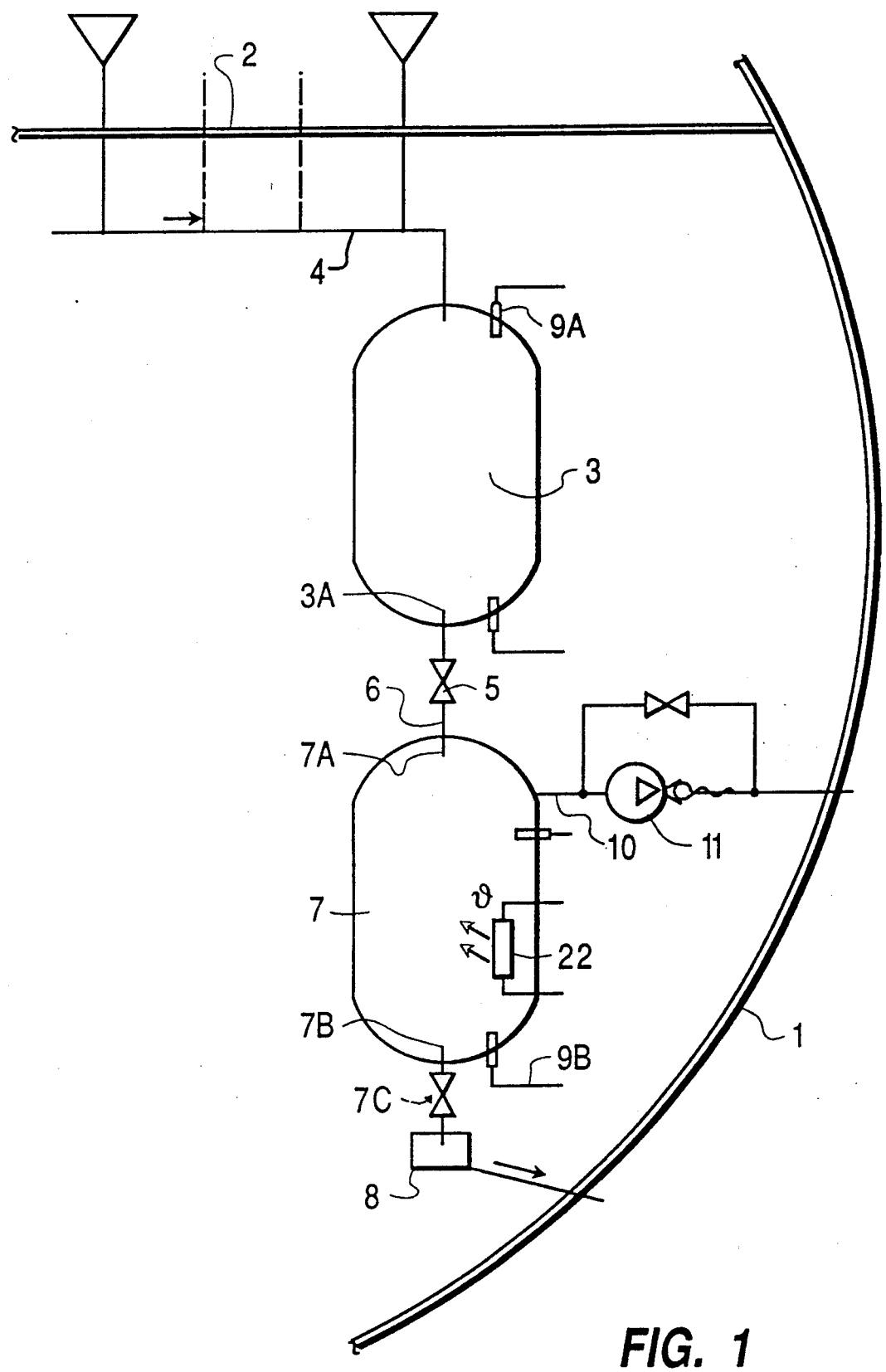
FIG. 1 is a schematic which shows one embodiment of an apparatus according to the principles of the invention disposed in the cargo area of an aircraft.

Referring to FIG. 1, there is shown a fecal matter tank 3, which receives fecal matter from various toilets arranged in an aircraft through a conduit 4, disposed in the cargo area of the aircraft having an outer skin 1 and a partition 2 to a passenger area (not identified). Fecal matter tank 3 has an outlet 3a connected by way of a pipeline 6, that is closable by a controllable valve 5, with an inlet 7a of a dehydration tank 7, the latter including a heating device 22 and an outlet conduit 7b for discharge of evaporated water, as well as a worm press 8 for compacting and removing the remaining fecal matter by way of a pipeline and valve 7c. Fill level sensors 9a and 9b are disposed at fecal matter tank 3 and at dehydration tank 7, respectively. The output signals from these sensors are fed to a control device (not shown) which makes available an opening signal for valve 5 and initiates a dehydration process by activating heater 22.

Figure 2:
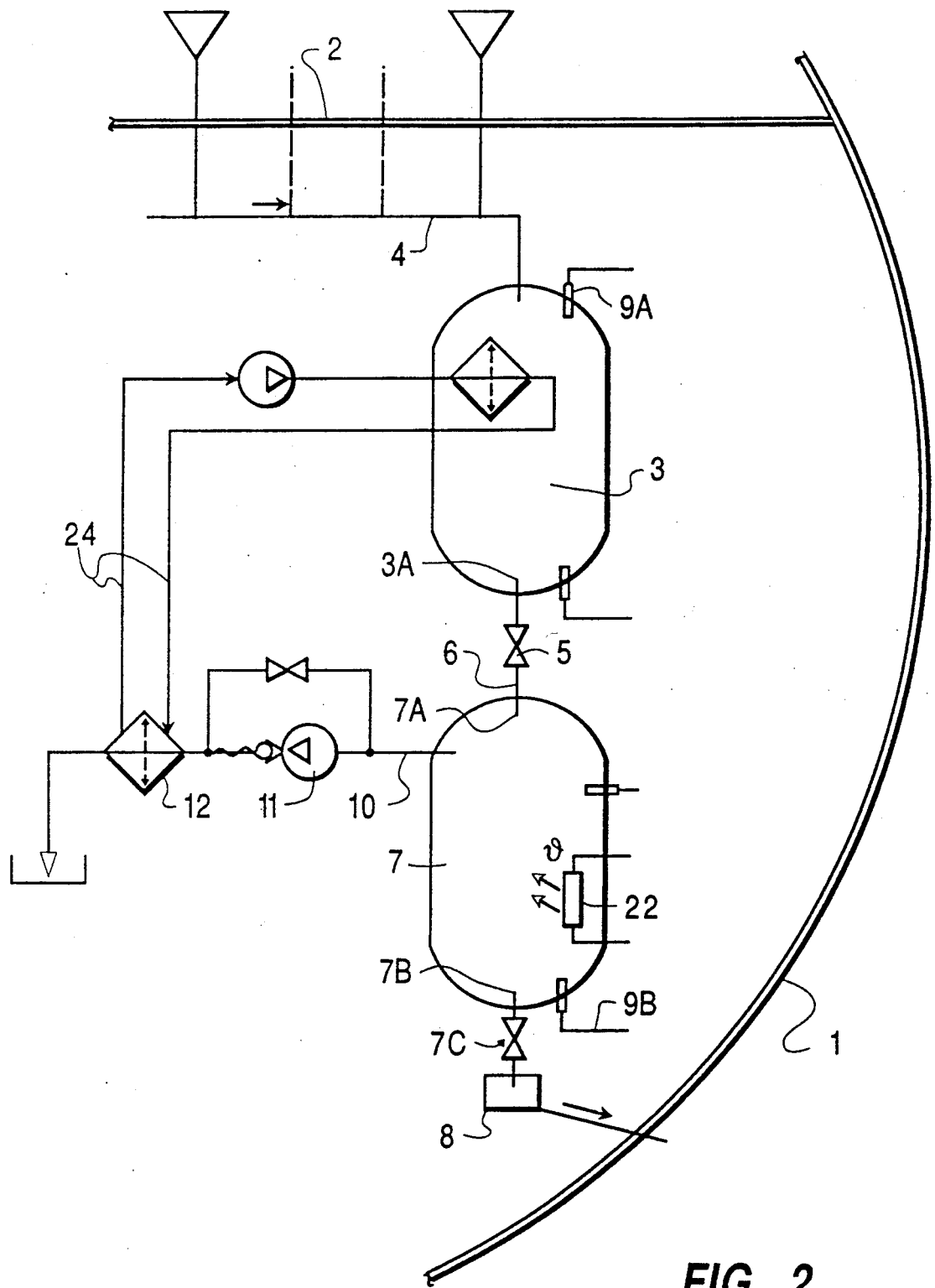
FIG. 2 is a schematic which shows a modification of the embodiment illustrated in FIG. 1.

A discharge conduit 1 which includes a motor driven pump 11 for removing the evaporated water may either be in communication with the environment around the vehicle as shown in FIG. 1 or may be connected with a condenser 12 for the recovery of utility water as shown in FIG. 2. The same reference numerals are employed for the same components in FIGS. 1 and 2. Preferably, condenser 12 is connected by way of a piping 24 with fecal matter tank 3 so as to enable it to discharge its condensation heat to newly supplied fecal matter.

Figure 3:
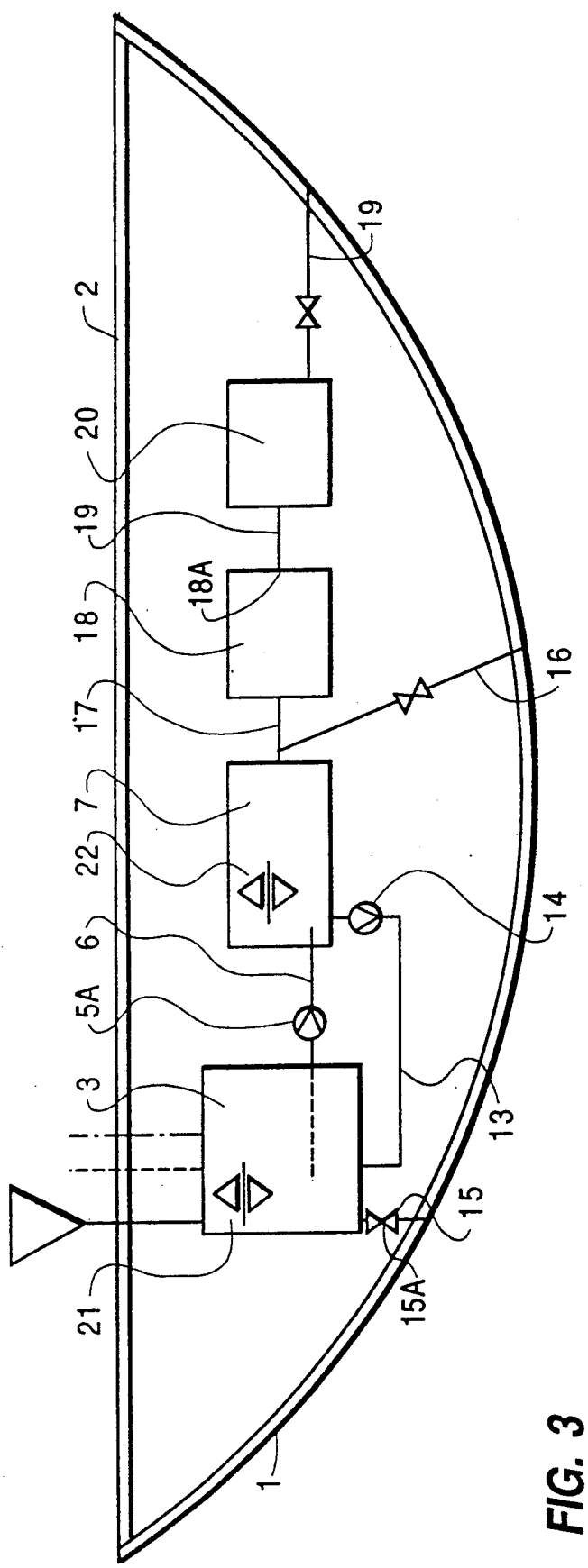
FIG. 3 is a schematic which shows another embodiment of an apparatus according to the principles of the invention employed preferably in the vicinity of a fecal matter collection tank.

As can be seen in FIG. 3, wherein like reference numerals are again used to designate components corresponding to those in FIGS. 1 and 2, at the installation location of the device according to the invention the aircraft is shown to have an outer skin 1 with a partition 2 to the passenger area. Within the installation location illustrated in FIG. 3 there is provided a fecal matter tank 3 which is connected, by way of a conduit 6 equipped with a pump and a valve shown schematically at 5a, with a dehydration tank 7 which may comprise a filtering device. In order to transport the remaining fecal matter from dehydration tank 7 into fecal matter tank 3, both tanks are connected with one another by way of a return pipeline 13 which includes a feed pump 14. Both tanks 3 and 7 are again provided with fill level sensors 21 and 22 whose output signals are fed to a control device (not shown) for driving feed pumps 5a and 14 and for initiating a dehydration process. While fecal matter tank 3 can be emptied by way of a pipeline 15 provided with a valve 15a, water removed from the remaining fecal matter in dehydration tank 7 flows either through a discharge pipeline 16 into the environment of the vehicle or, if required, through a conduit 17 into a fine filtering device 18. For the case that the water discharged to the environment of the vehicle must be improved with respect to its coloration, for example because of legal requirements, the fine filtering device 18 is connected downstream of dehydration tank 7. Fine filtering device 18 has an outlet 18a which is in communication by way of a discharge conduit 19 selectively with the environment of the vehicle (this case not being shown) or with a disinfection system 20. In the latter case, disinfection device 20 is (selectively) arranged in discharge conduit 19 in order to disinfect the water if required. In this way, it is advantageously accomplished that the extracted water can also be discharged to the environment at low flying altitudes in which environmental conditions are not sufficient to disinfect the water. Disinfection device 20 may be omitted for flying altitudes at which sterilization and destruction of germs occurs by ozone and ultraviolet light.

The advantages of the apparatus of FIG. 3 are that only insignificant modifications need to be made to an existing apparatus equipped with a fecal matter tank and a subsequently arranged dehydration tank and that the fecal matter tank can be reduced in size since it primarily serves to accommodate dehydrated remainders of fecal matter. Sublimation is commonly known as a phenomenon by which a solid material changes into a gaseous condition without passing through the liquid condition, i.e. ice turns from solid condition to vapour without passing the liquid condition as explained in FIG. 1 dotted area in the "Encyclopedia How Things Work, Volume I, pape 15". The Encyclopedia "Der große Brockhaus, 1957, pages 681 and 682" gives two examples in two different sketches of the centrifuging components. The principle explained in the upper sketch would be applied in a modified form. In FIG. 4 the fecal matter enters a prefilter 40 at position 6. Prefilter 40 contains two different strainers, the first one with wide bore holes i.e. 8 mm φ and second one with 1 mm φ bore holes. Prefilter 40 separates solid and semisolid fragments of the fecal matter from the liquids. Solid and semisolid mass leaves 40 via pipelines 13 and is being fed back into tank 3. The liquids leave 40 via pump 42 and a pipeline 43 and enter filter 44 which is connected in series to filter 45 via a pipeline 46. An interconnection between pipelines 16 and 47 may allow the filtered liquids to leave the total system or, if a higher cleaning grade is required, to enter a fine filter 18 and and after having passed this filter 18 being disinfected in U.V-disinfection unit 20. Unit 20 is connected to filter 18 via a pipeline 48. The filtered and disinfected water can leave the system via a pipeline 49. In FIG. 5 a commonly known inverted osmotic process is being applied to separate liquids and solved minerals from solid components of fecal matter. The fecal matter will be supplied via pipeline 6. The pump 5 A induces the pressure which is necessary to operate the inverted osmotic process. Tank 7 will in this case be separated into two halves by means of inserting a semipermeable membrane 50 in between both halves of tank 7. The pressure, generated by pump 5 A works counter the osmotic pressure and water penetrates through membrane 7 and leaves the tank via pipeline 17 In FIG. 6 the pipeline 6 of FIG. 3 is connected to the input 60 of the worm press. The pump 5a feeds the fecal-matter in to the worm press via pipeline 6. A drive equipment 61 rotates the worm 62 and the fecal matter is transported towards the front end 63 of the worm press, which contains bore holes 64. The bore holes 64 are the outlet for the compressed fecal matter. The outlet 64 is connected to pipeline 13, via pump 14. The pitch 65 of the thread on the surface of the worm decreases towards the front end 63 of the press. As also the diameter decreases, the fecal matter is compressed on its way towards the front end 63 and consequently the liquids are squeezed out and returned to outlet 66 via small slots 67. The outlet is connected to the intersection of pipelines 16 and 17. From various machinery handbooks wick lubricator systems are commonly known. The adhesion i.e. between liquids and coton made wicks can also be applied to separate liquids of fecal matter.

It will be understood that the above description of the present invention is susceptible to various modifications, changes and adaptations, and the same are intended to be comprehended within the meaning and range of equivalents of the appended claims.

What is claimed is:

1. A method of disposing of fecal matter from a toilet system in a fast moving vehicle during travel of the vehicle, comprising:

dehydrating liquid components of the fecal matter to recover water, said dehydrating step including separating liquid from solid fecal matter by filtering;

disposing of the water by one of discharging the water to the environment of the vehicle and reusing the water in systems of the vehicle; and introducing the remainder of the fecal matter into a collection vessel in the vehicle.

2. A method as defined in claim 1, further comprising compacting the remainder of the fecal matter.

3. A method as defined in claim 1, wherein said disposing step includes using the recovered water as toilet rinsing water.

4. A method as defined in claim 1, further comprising: dehydrating liquid components of garbage waste; disposing the water recovered therefrom by one of discharging it to the environment of the vehicle and reusing the recovered water in systems of the vehicle; and introducing the remaining garbage into a collection vessel.

5. A method of disposing of fecal matter from a toilet system in a fast moving vehicle during travel of the vehicle, comprising:
dehydrating liquid components of the fecal matter to recover water, said dehydration step including separating liquid from solid components of fecal matter by means of an inverted osmotic separation process;
disposing of the water by one of discharging the water to the environment of the vehicle and reusing the water in systems of the vehicle; and
introducing the remainder of the fecal matter into a collection vessel in the vehicle.

6. An apparatus for disposing of fecal matter from a toilet system in a fast moving vehicle during travel of the vehicle comprising:
fecal matter tank means for receiving fecal matter from a toilet system and having an outlet;
a pipeline having one end connected to the outlet of said fecal matter tank means and including a controllable valve for opening and closing said pipeline;
dehydration tank means having an inlet connected to another end of said pipeline for receiving liquid components of fecal matter when said valve is open, said dehydration tank means further including heating means for heating the liquid components of the fecal matter, a discharge conduit for removing water evaporated from the liquid components of the fecal matter, and a worm press for compacting and removing the remainder of the fecal matter;
fill level means disposed in said fecal matter tank means and in said dehydration tank means for producing output signals representing the fill levels of the respective tank means; and
control means connected for receiving the output signals of said fill level means and having an output connected to said controllable valve for opening said valve in dependence of the fill levels of said tank means and connected to said heating means for initiating a dehydration process.

7. An apparatus as defined in claim 6, further comprising a motor driven pump disposed in the discharge conduit of said dehydration tank means for removing evaporated water.

8. An apparatus as defined in claim 6, wherein the discharge conduit of said dehydration tank means is in communication with environment around said vehicle.

9. An apparatus as defined in claim 6, further comprising condenser means connected with the discharge conduit of said dehydration tank means for recovering utility water and for recovering heat from said apparatus.

10. An apparatus as defined in claim 6, further comprising fine filtration means connected downstream of said dehydration tank means and including a discharge conduit in communication with the environment of the vehicle.

11. An apparatus for disposing of fecal matter from a toilet system in a fast moving vehicle during travel of the vehicle, comprising:
fecal matter tank means for receiving fecal matter from a toilet system and having an outlet;
a pipeline having one end connected to the outlet of said fecal matter tank means and including a controllable value for opening and closing said pipeline;
dehydration tank means having an inlet connected to another end of said pipeline for receiving liquid components of fecal matter when said valve is open, said dehydration tank means further including heating means for heating the liquid components of the fecal matter, a discharge conduit for removing water evaporated from the liquid components of the fecal matter, and a worm press for compacting and removing the remainder of the fecal matter;
condenser means connected with the discharge conduit of said dehydration tank means for recovery utility water and for recovering heat from said apparatus; and
a pipeline connecting said condenser means with said fecal matter tank means for discharging condensation heat to fecal matter newly introduced into said fecal matter tank means.

12. An apparatus for disposing of fecal matter from a toilet system in a fast moving vehicle during travel of the vehicle, comprising:
fecal matter tank means for receiving fecal matter from a toilet system in the vehicle and having an outlet;
a first pipeline having one end connected to the outlet of said fecal matter tank means;
dehydration tank means including an inlet connected to another end of said first pipeline for receiving liquid components of fecal matter from said fecal matter tank means;
dehydration means disposed in said dehydration tank means for removing water from the liquid components of the fecal matter; and
a return pipeline, including a feed pump, connecting said dehydration tank means to said fecal matter tank means for moving fecal matter remaining in said dehydration tank means into the fecal matter tank means.

13. An apparatus as defined in claim 12, further comprising a valve disposed in said first pipeline for opening and closing said first pipeline.

14. An apparatus as defined in claim 12, further comprising a discharge pipeline connecting said dehydration tank means to the environment of the vehicle for discharging water removed from the fecal matter.

15. An apparatus as defined in claim 12, further comprising filtering means disposed in said dehydration tank means for filtering water removed from the fecal matter.

16. An apparatus as defined in claim 12, further comprising fine filtration means connected downstream of said dehydration tank means and including a discharge conduit in communication with the environment of the vehicle.

17. An apparatus as defined in claim 16, further comprising disinfecting means disposed in said discharge conduit.

18. An apparatus as defined in claim 13, further comprising fill level sensor means disposed in said fecal tank means and in said dehydration tank means for producing respective output signals representing the fill level of each of said tank means, and control means coupled for receiving the output signals of said fill level sensor means and having outputs connected for controlling said valve and said feed pump and initiating the dehydration process in said dehydration tank means in dependence of the output signals of said fill level sensor means.

* * * * *